US009633094B2

United States Patent
Rambo et al.

(10) Patent No.: US 9,633,094 B2
(45) Date of Patent: Apr. 25, 2017

(54) DATA LOAD PROCESS

(71) Applicant: Bank of America Corporation, Charlotte, NC (US)

(72) Inventors: Ron G. Rambo, West Coxsackie, NY (US); Steven A. Walker, North Salt Lake, UT (US); Meng Gu, Marietta, GA (US)

(73) Assignee: Bank of America Corporation, Charlotte, NC (US)

( * ) Notice: Subject to any disclaimer, the term of this patent is extended or adjusted under 35 U.S.C. 154(b) by 298 days.

(21) Appl. No.: 14/262,014

(22) Filed: Apr. 25, 2014

(65) Prior Publication Data

US 2015/0310076 A1    Oct. 29, 2015

(51) Int. Cl.
G06F 17/30    (2006.01)

(52) U.S. Cl.
CPC .............................. G06F 17/30563 (2013.01)

(58) Field of Classification Search
CPC ................................................ G06F 17/30563
See application file for complete search history.

(56) References Cited

U.S. PATENT DOCUMENTS

| 6,553,392 | B1 | 4/2003 | Mosher, Jr. et al. |
| 6,668,253 | B1 | 12/2003 | Thompson et al. |
| 6,691,115 | B2 | 2/2004 | Mosher, Jr. et al. |
| 6,732,089 | B1 | 5/2004 | Sinn |
| 7,739,296 | B2 | 6/2010 | Korn et al. |
| 7,853,621 | B2 | 12/2010 | Guo |
| 8,356,010 | B2 | 1/2013 | Driesen |
| 2003/0028555 | A1 | 2/2003 | Young et al. |
| 2003/0061225 | A1* | 3/2003 | Bowman ........... G06F 17/30067 |
| 2005/0187974 | A1 | 8/2005 | Gong |
| 2006/0026199 | A1 | 2/2006 | Crea |
| 2008/0103888 | A1* | 5/2008 | Weir ...................... G06Q 30/02 705/14.56 |

OTHER PUBLICATIONS

"A Distributed Terminology Refresher on DB2 DDF Subsystem Parameter Settings," Willie Favero, Enterprise Tech Journal, Mar. 5, 2014.
"DDF in a nutshell," Bill Arledge, BMC Software, Inc., Apr. 20, 2010.
"Message queue," Wikipedia, retrieved Nov. 11, 2015 from <URL: https://en.wikipedia.org/wiki/<essage_queue>.
"Message Queuing (MSMQ)," Microsoft, 2015, retrieved from <URL: https://msdn.microsoft.com/en-us/library/ms711472(v=vs.85).aspx>.

* cited by examiner

*Primary Examiner* — William Spieler
(74) *Attorney, Agent, or Firm* — Banner & Witcoff, Ltd.; Michael A. Springs

(57) ABSTRACT

A source data file can be loaded into a database by extracting data from the source data file at a computing device, validating the data from the source data file at the computing device, transforming the data from the source data file at the computing device, requesting the data to be transferred to a first database at a first message processor module, delivering the data to the first database, and responding that the data has been transferred to the first database at the first message processor module to acknowledge receipt of the data in the database at the computing device.

8 Claims, 4 Drawing Sheets

DATA LOAD PROCESS

FIELD

Aspects of the disclosure generally relate to a data load process. More specifically, aspects of the disclosure provide example methods and example apparatuses that provide a data load process using native stored procedures to concurrently load multiple data files into a table or database at one time.

BACKGROUND

Information technology infrastructures may require several operating environments, vendor resource deployment, authentication repositories and mechanisms, application servers, and databases for storing, indexing, and updating massive amounts of data constantly. In order to operate a large entity's information technology and be able to store, index, and manage data received by the entity, these systems and processes can be configured to work together.

Databases load data received by the entity for indexing continuously in order to keep up with the volume of data an entity receives and/or tracks on a daily basis. Frequently, the data stored by the entity may need to be updated. This may occur for a variety of reasons, including mistakes in the loading, changing flags, changes in the information, or the like. The process of database loading and updating takes time, central processing units (CPU) away from the infrastructure, logging time, and in some cases has redundancies and other issues associated with the process.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In one example, a source data file can be loaded into a database by performing one or more of: (1) extracting data from the source data file at a computing device, (2) validating the data from the source data file at the computing device, (3) transforming the data from the source data file at the computing device, (4) requesting the data to be transferred to a database at a message processor module, (5) delivering the data to the database, or (6) responding that the data has been transferred to the database at the message processor module to acknowledge receipt of the data in the database at the computing device.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of examples various examples in which the disclosure may be practiced. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. For example, the use of "including" and "comprising" and variations thereof is meant to encompass the items listed thereafter and equivalents thereof as well as additional items and equivalents thereof, and the use of the terms "mounted," "connected," "coupled," "positioned," "engaged" and similar terms, is meant to include both direct and indirect mounting, connecting, coupling, positioning and engaging.

As noted above, various aspects of the disclosure relate to a system and method for data loading. In one example, the system is configured to conduct a data load process using native stored procedures to concurrently load multiple data files into a table at one time. Files can be sent to a server where they will be extracted validated, split into units of work (e.g. 2500 records per job), and transformed into the proper format (e.g. XML load files). These files can be configured as messages on a message processor module and picked up using a listener module, for example. Data can be loaded into temporary tables prior to a final load. Before discussing these aspects in greater detail, however, several examples of network architectures and data processing devices that may be used in implementing various aspects of the disclosure will first be discussed.

Figure 1:
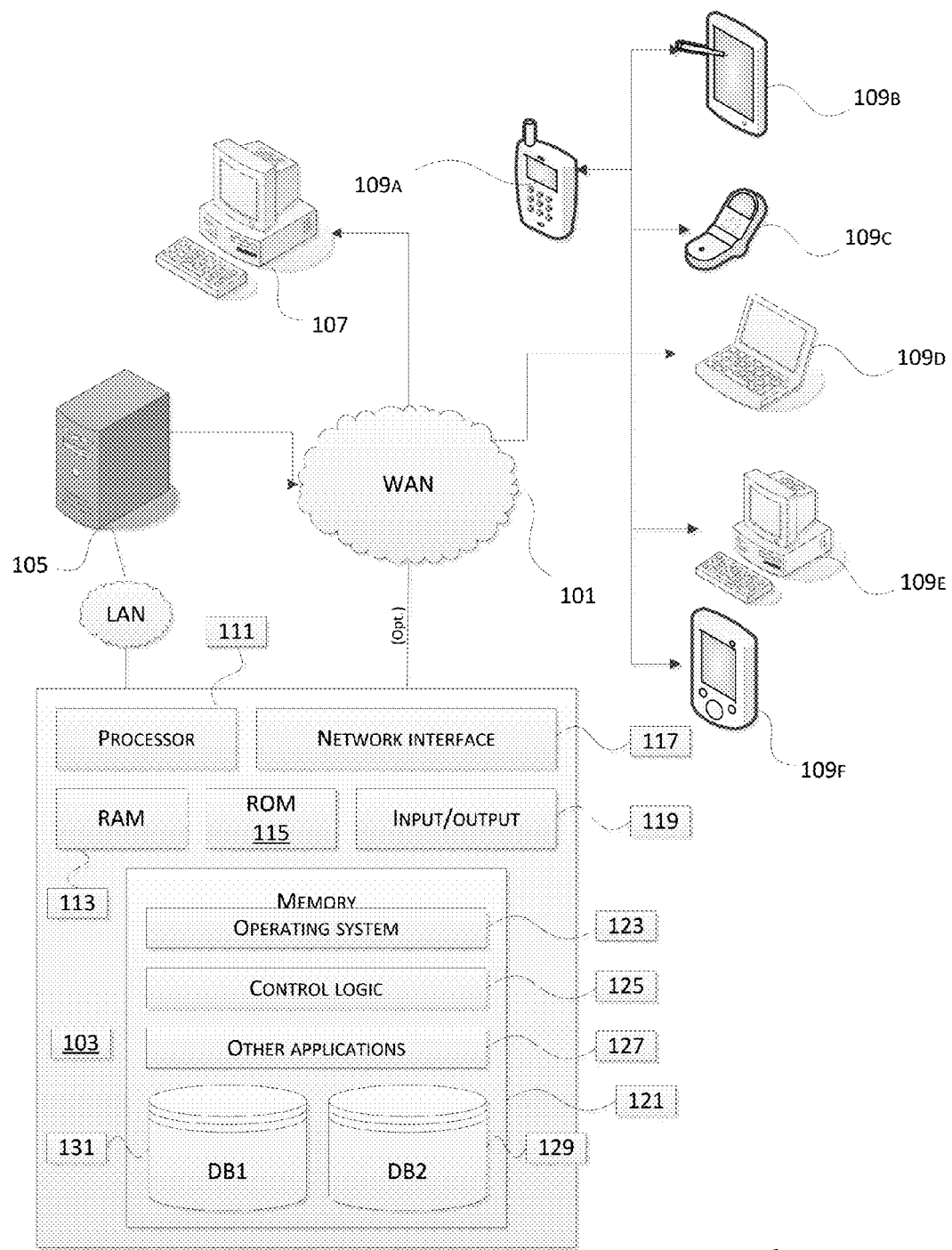
FIG. 1 illustrates one example of a network architecture and data processing device that may be used to implement one or more illustrative aspects discussed herein.

FIG. 1 illustrates one example of a network architecture and data processing device that may be used to implement one or more illustrative aspects. Various network nodes 103, 105, 107, and 109A-F may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109A-F and other devices (not shown) may be connected to one or more of the networks via twisted pair wires, coaxial cable, fiber optics, radio waves or other communication media. For example, the above connections can be made via the internet, blue tooth, WiFi, infrared, or any other known method of wireless transmission.

As shown in FIG. 1, devices 109A-F may include personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as ATMs, kiosks, and other devices can be connected to one or more of the networks described herein. These devices can be enabled to communicate with wireless access points which in one example can be a series of cellular towers hosted by a service provider. Additionally, the wireless access points may be Wi-Fi (e.g., compatible with IEEE 802.11a/b/g/and the like wireless communication standards) connections and the computing devices may obtain access to the Internet at these connections. Other known techniques may be used to allow devices to connect with a network.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, and devices 109a-f. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, devices 109a-f, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 or devices 109a-f a user may access web server 105 using an Internet browser, as is known in the art, or by executing a software application or app that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device as discussed herein. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, or the like), and memory 121. I/O 119 may include a variety of interface units and drives for reading, writing, displaying, and/or printing data or files. Memory 121 may further store operating system software 123 for controlling overall operation of the data server 103, control logic/data server software 125 for instructing data server 103 to perform aspects as described herein, and other application software 127 providing secondary, support, and/or other functionality which may or may not be used in conjunction with one or more aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, or the like).

Memory 121 may also store data used in performance of one or more aspects, including a first database 129 and a second database 131. In some embodiments, the first database may include the second database (e.g., as a separate table, report, or the like). That is, the information can be stored in a single database, or separated into different logical, virtual, or physical databases, depending on system design. Devices 105, 107, 109A-F may have similar or different architecture as described with respect to device 103. Those of skill in the art will appreciate that the functionality of data processing device 103 (or device 105, 107, 109A-F) as described herein may be spread across multiple data processing devices, for example, to distribute processing load across multiple computers, to segregate transactions based on geographic location, user access level, quality of service (QoS), or the like.

One or more aspects may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
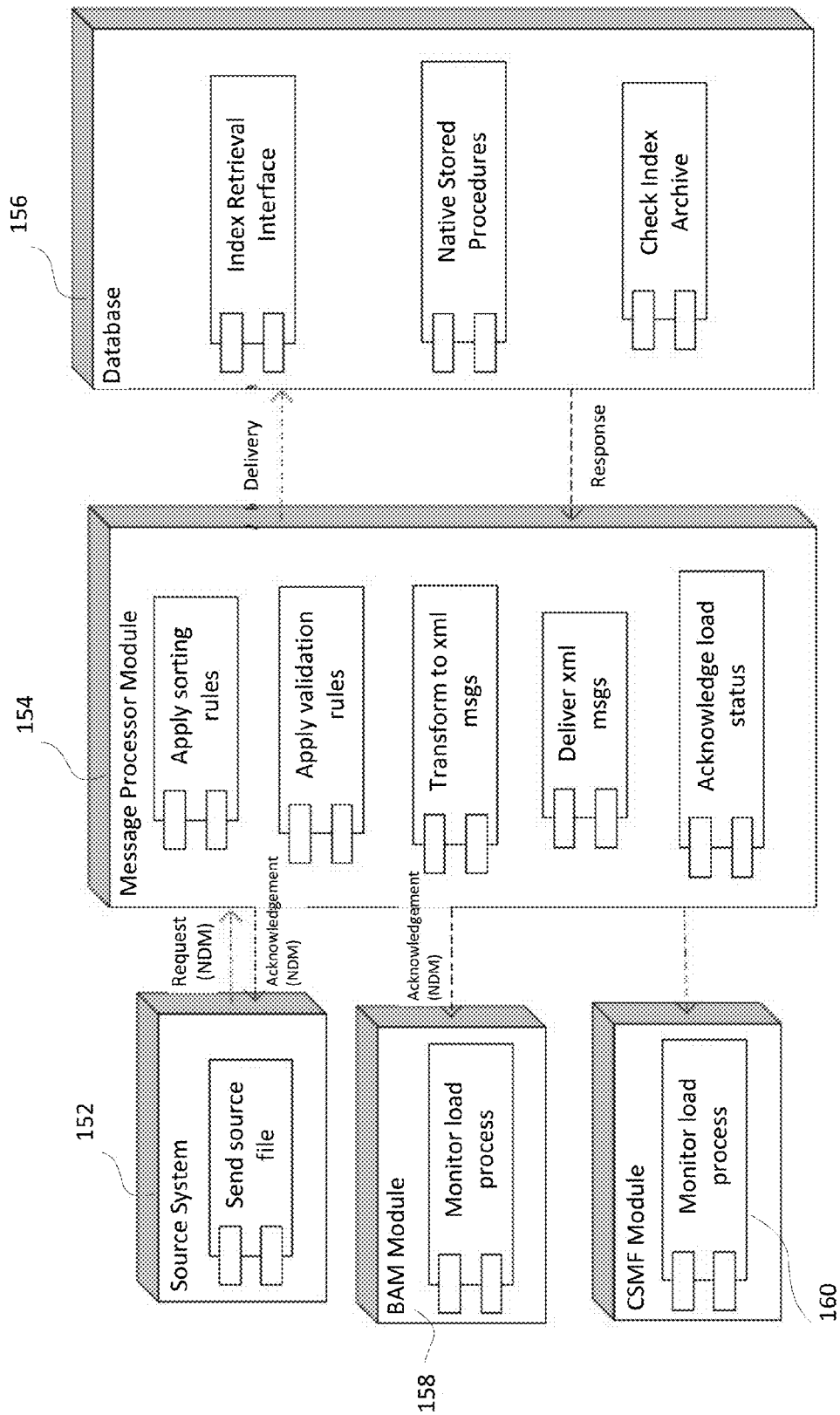
FIG. 2 illustrates a schematic of an example database loading system.

A schematic of an exemplary system is shown in relation to FIG. 2. As shown in FIG. 2, the system may include one or more of a source system 152, a message processor module 154, a database 156, a check system monitoring facility (CSMF) module 160, and a business activity monitoring (BAM) module 158. The source system 152 can be configured to request that source files be delivered to the database 156 through the message processor module 154. The message processor module 154 can be configured to apply sorting rules and to apply validation rules to the data. The sorting rules can order the data by database table clustering order for example, by listing the date and then the account number. The validation rules may include checking the data for redundancies, inconsistencies or format issues associated with the data or, more particularly, checking to see if dates are dates, numeric data is numeric, and the like.

The message processor module 154 can also be configured to transform the data files into an XML format and to deliver XML formatted messages. Once the data is transferred to the database 156, the message processor module 154 can also acknowledge the loading status of the files to either the check system monitoring facility (CSMF) module 160 the business activity monitoring unit (BAM) module 158, for example. The database 156 can be configured to store the source file data. In this way, the delivery process can be monitored by either the CSMF module 160 or the BAM module 158. The database 156 can also include an index retrieval interface, native stored procedures, and a check index archive. These can provide various functions such as retrieval and insert interfaces, along with a response function once the data is loaded. In one example, the database 156 can be configured to send a response to the message processor module 154 so the message processor module 154 can acknowledge that the database 156 has received the source file data.

Figure 3:
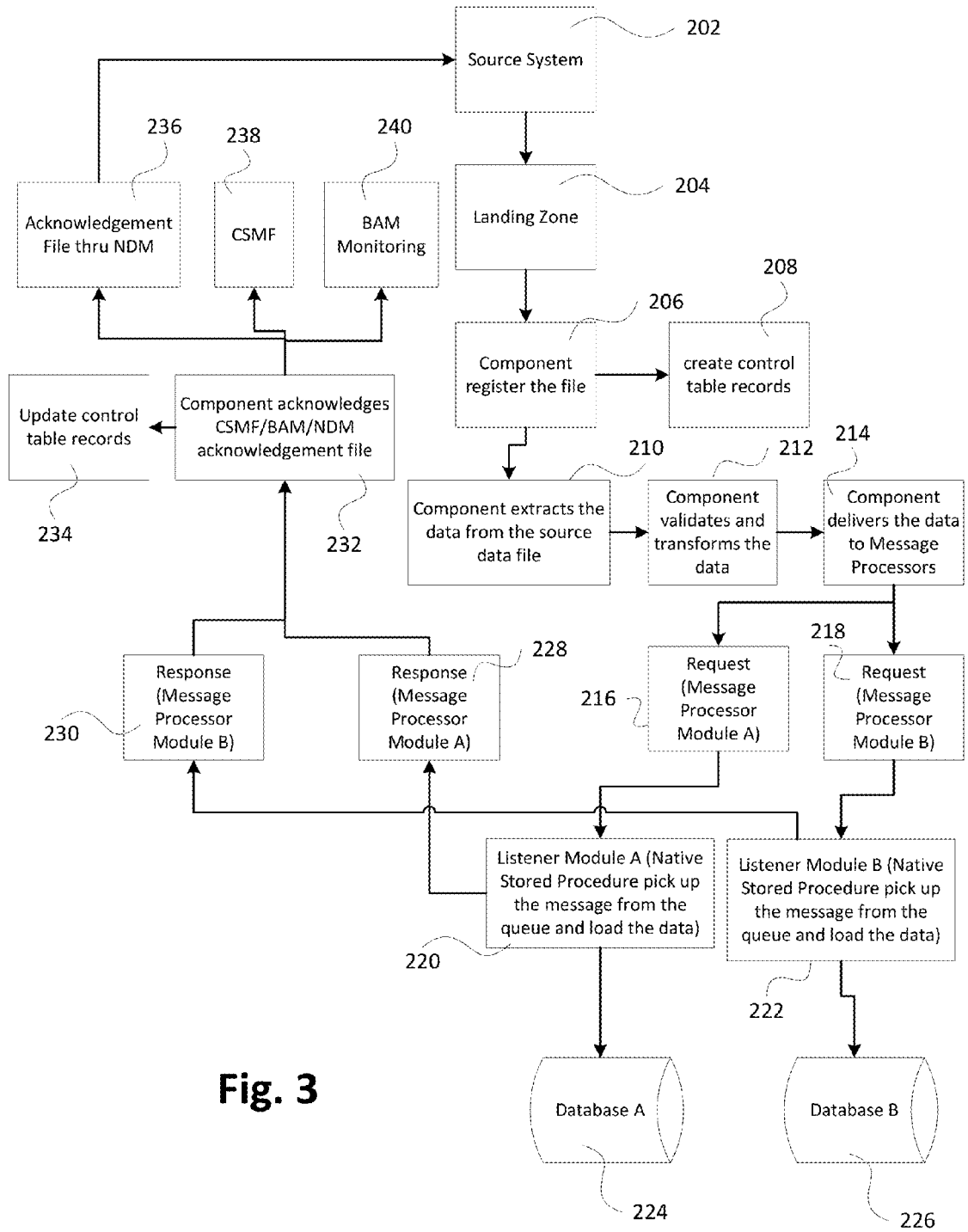
FIG. 3 depicts an example process for loading data.

An exemplary process for loading of data files is depicted in relation to FIG. 3. As shown in FIG. 3, the process can be initiated by a source system at step 202 in sending a source data file to be stored into a database to a landing zone at step 204. At step 204, the landing zone step can be in a computing device in a network, server or cloud, for example. The computing device can then register the file at step 206 and create control table records at step 208. A software component or module can extract the data from a source data file at the computing device at step 210, and validate and transform the data from the data source file at the computing device in step 212. The software component can also include a poller that watches for files from the source system. In an alternative example, a quartz scheduler could be used to find files that arrive.

In the validation step 212 the software component can check for certain errors in the data by using a rule engine, for example, by checking the various data fields. In one example, the validation process can include reviewing the data for redundancies, inconsistencies or format issues associated with the data, such as, checking to see if dates are dates, numeric data is numeric, and the like. Also along with validation in step 212, the data can be transformed into a readable format for the database, such as XML, text, image, zipped data, SQL or another computer reusable format for storage. The data may also be split into units of work (e.g. 2500 records per job). Once the data is validated, transformed and split up accordingly, at step 214, the software component can deliver the data to one or more message processor modules at either step 216 or 218. In this process, the software component can assign the data using round-robin scheduling or can determine which message processor module to send the data to based on message processor bandwidth, or other techniques. Also in this process the software component can effectively request that the data be transferred to a certain database at the message processor modules at steps 216, 218.

At steps 216, 218, the message processor modules send the data to a listener module. At step 220, 222, the listener modules will execute a native stored procedure which will parse the XML and load the unit of work into a global temporary table, which can then be inserted or delivered into either database A at step 224 or database B at step 226. Since the data was previously validated, the data can easily be added onto the selected database. Once the data is successfully transferred, the message processor modules can post a response at step 228, 230, which can indicate that the data has been transferred to either database A or database B at the message processor modules to acknowledge receipt of the data in the database at the computing device. As depicted in FIG. 3, the response may originate from either listener module A or listener module B. In this way, the software component on the computing device can acknowledge the data delivery.

The software component can also update the control records at step 234 based on the acknowledgment message. At step 236 the acknowledgement receipt can then be routed back to the source system through a NDM file transfer. The acknowledgement can also be received at check system monitoring facility (CSMF) module at step 238 or a business activity monitoring (BAM) module at step 240.

Figure 4:
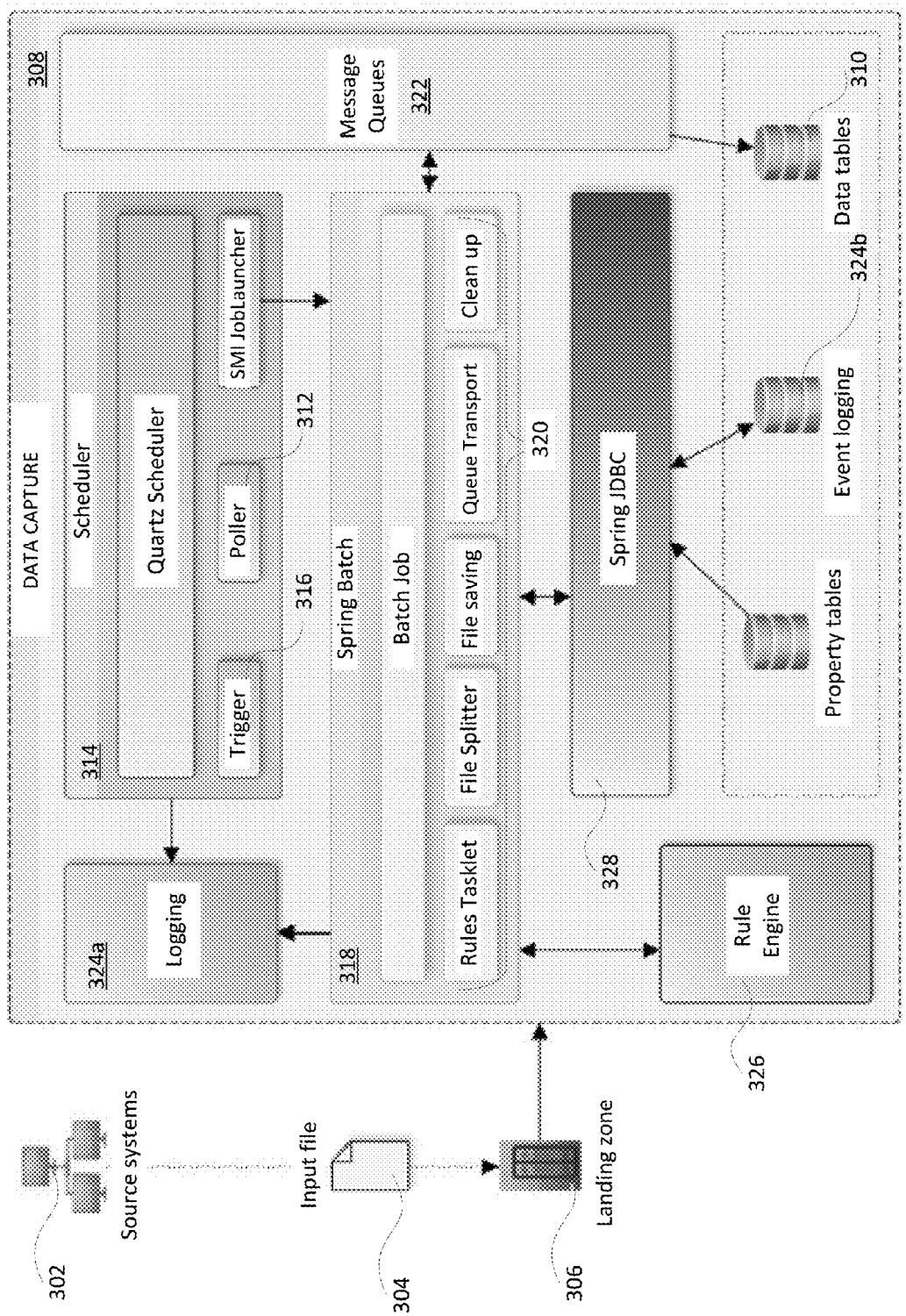
FIG. 4 depicts a schematic of an alternative example database loading system.

FIG. 4 shows another example process that can be used for extraction, transformation, validation and delivery of files. As shown in FIG. 4, an input file 304 can be received from source systems 302 at a landing zone 306, which can be a computing device in a network, server or cloud, for example. The file can then undergo a data capture process 308 where the file is stored into data tables 310. First, the poller 312 can identify existence of a new file and can apply a trigger 316 to trigger the scheduler 314 for processing file. A spring batch component 318 can then use modular rules 320 to split, sort, validate, clean, and transmit to database component as defined for each file type. The message queues 322 can be used as the transport protocols which move the data from the data capture platform to the database. Logging services 324a, 324b can be called throughout the ingestion and loading process. Modular rules 326 can be stored and reused to define new spring batch flows. The spring JDBC 328 can be configured as a database communication layer for event logging and processing state details.

The example systems and processes discussed herein may help to reduce dependency on a mainframe server, by conducting some of the validation prior to loading the data into the database. This may also result in cost savings, since less expensive processors can be used. The process can also be more flexible in reducing the need for having batch files. Also the use of DDF threads or connections can be reduced such that DDF thread use does not compete with online retrieval, which saves on bandwidth that can be used for other processes such as inserting and requesting data from the database.

The processes disclosed herein may help to eliminate a significant number of processors and may be run on lower cost processors that do not require the payment of fees. The system can also help to eliminate redundant data extraction and transformation processes at dual database sites because the validation and transformation can be done up front before arriving at the database sites. This can help reduce the amount of processing required since these steps will only need to be performed once. The system can be configured to reject any incoming file with invalid data from the source system.

In one example, the system can help reduce the overall dependency on the mainframe by validating the data prior to loading the data into the database. Also the use of DDF threads can reduced such that the current process does not compete with online retrieval. This can help certain data insert activity more efficient as data is constantly loaded into the database and data is constantly requested from the database.

In one example, a computer-implemented method for loading a source data file can include one or more of the following steps: extracting data from the source data file at a computing device, validating the data from the source data file at the computing device, transforming the data from the source data file at the computing device, requesting the data to be transferred to a first database at a first message processor module, delivering the data to the first database, or responding that the data has been transferred to the first database at the first message processor module to acknowledge receipt of the data in the database at the computing device. The computing device can be a server in one example. A first listener module can receive the data from the first message processor and can load the data onto the first database. The method may also include one or more of: routing the acknowledgement receipt to a source system, receiving the acknowledgement receipt at a check system monitoring facility, receiving the acknowledgment receipt at a business activity monitoring unit, or updating control records based on the acknowledgment receipt.

Additionally, a second message processor module can be configured to deliver the data to a second database. The second listener module can receive the data from the second message processor and can load the data onto the second database.

In another example method for loading a data file may include one or more of the following steps: send a data file request from a source system, receive the request, apply validation rules, and transform the data at a message processor module, deliver the data by the message processor module to a database, respond to the message processor module that the data has been delivered, and acknowledge that the data has been delivered by the message processor. A second message processor module can be configured to deliver the data to a second database. The apparatus can also be configured to update control records based on the acknowledgment receipt, route the acknowledgement receipt to a source system module, receive the acknowledgement receipt at a check system monitoring facility module, or receive the acknowledgment receipt at a business activity monitoring module.

In another example method for loading a data file may include one or more of the following steps: send a request from a source system module to deliver a source data file to a first database, extract data from the source data file at a computing device, validate the data from the data source file at the computing device, transform the data from the data source file at the computing device, request the data to be transferred to a first database at a first message processor module, deliver the data to the first database, and respond that the data has been transferred to the first database at the first message processor module to acknowledge receipt of the data in the database at the computing device. The computing device may be server, and a second message processor module can be configured to deliver the data to a second database. The method may also include updating control records based on the acknowledgment receipt, routing the acknowledgement receipt to a source system. The load process can be monitored by a check system monitoring facility module, and the load process can also be monitored by a business activity monitoring module.

In another example, an apparatus comprising: a processor; and a memory for storing computer readable instructions that, when executed by the processor, can cause the apparatus to perform the methods discussed herein. In another example, one or more non-transitory computer-readable media may have instructions stored thereon that, when executed, cause at least one computing device to perform one or more aspects of the methods discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method for loading a source data file comprising:
   extracting, by a computing device, data from a source data file;
   validating, by the computing device, the data from the source data file;
   transforming, by the computing device, the data from the source data file to generate transformed data;
   sending, to a first message processor, a first request for the transformed data to be transferred to a first database;
   in response to the first request for the transformed data to be transferred to the first database, delivering the transformed data to the first database;
   sending, to a second message processor, a second request for the transformed data to be transferred to a second database;
   in response to the second request for the transformed data to be transferred to the second database, delivering the transformed data to the second database;
   generating, by the first message processor and the second message processor, a response that the transformed data has been transferred to the first database and the second database; and
   based on the response that the transformed data has been transferred to the first database and the second database, generating, by the computing device, an acknowledgement indicating that the first database and the second database received the transformed data.

2. The method of claim 1, wherein the computing device comprises a server.

3. The method of claim 1, wherein delivering the transformed data to the first database comprises:
   receiving, by a first listener device, the transformed data from the first message processor; and
   loading, by the first listener device, the transformed data onto the first database, and
wherein delivering the transformed data to the second database comprises:
   receiving, by a second listener device, the transformed data from the second message processor; and
   loading, by the second listener device, the transformed data onto the second database.

4. The method of claim 1, wherein delivering the transformed data to the second database comprises:
   receiving, by a listener device, the transformed data from the second message processor; and
   loading, by the listener device, the transformed data onto the second database.

5. The method of claim 1, further comprising updating control records based on the acknowledgement.

6. The method of claim 1, further comprising routing the acknowledgement to a source system.

7. The method of claim 1, further comprising receiving the acknowledgement at a check system monitoring facility.

8. The method of claim 1, further comprising receiving the acknowledgement at a business activity monitoring unit.

* * * * *